(12) United States Patent
Bridge et al.

(10) Patent No.: US 8,234,082 B1
(45) Date of Patent: Jul. 31, 2012

(54) METHODS AND SYSTEMS FOR DATA SMOOTHING STRESS DATA

(75) Inventors: Ralph J. Bridge, La Plata, MD (US); Gary L. Biggs, Sliver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 293 days.

(21) Appl. No.: 12/583,570

(22) Filed: Aug. 18, 2009

(51) Int. Cl.
 *G06F 19/00* (2011.01)
(52) U.S. Cl. .......................................... 702/42
(58) Field of Classification Search .............. 702/42, 702/189; 73/54.37, 54.41
 See application file for complete search history.

(56) References Cited

U.S. PATENT DOCUMENTS

| 5,463,896 | A | 11/1995 | Abbate et al. |
| 5,788,640 | A | 8/1998 | Peters |
| 6,006,608 | A | 12/1999 | Renz et al. |
| 6,301,970 | B1 * | 10/2001 | Biggs et al. ............. 73/804 |
| 6,823,286 | B2 | 11/2004 | Yuste et al. |
| 7,139,674 | B2 | 11/2006 | Switlik et al. |
| 7,428,478 | B2 | 9/2008 | Aragones |
| 2007/0265790 | A1 * | 11/2007 | Sealing et al. .......... 702/33 |
| 2000/0091977 | | 4/2008 | Miguelanez et al. |

* cited by examiner

*Primary Examiner* — Bryan Bui
(74) *Attorney, Agent, or Firm* — Fredric J. Zimmerman

(57) ABSTRACT

Methods and systems for data smoothing raw data such as stress data. The present invention may utilize various techniques to smooth data such as dropping data using a stress threshold, dropping data by resample (or decimation), and smoothing by dynamic binning. Additionally, the present invention may utilize a transform function to estimate stress from a stress sensor to areas of peak stress. In an exemplary application, the present invention can be utilized to reduce stress data collected by a plurality of embedded stress sensors in a rocket motor for purposes of computing service life of the motor.

15 Claims, 9 Drawing Sheets

END EFFECTS

CIRCUMFERENTIAL EFFECTS

US 8,234,082 B1

METHODS AND SYSTEMS FOR DATA SMOOTHING STRESS DATA

STATEMENT OF GOVERNMENT INTEREST

The present invention described herein may be manufactured and used by or for the Government of the United States of America for government purposes without the payment of any royalties thereon or therefore.

FIELD OF THE INVENTION

The present invention relates generally to data smoothing techniques. More particularly, the present invention provides methods and systems for data smoothing raw data such as stress data and for transforming the raw data to provide individual service life predictions from measured stress data.

BACKGROUND OF THE INVENTION

The life limiting event of modern rockets is typically structural failure of the solid propellant. A failure may be a crack in the propellant or an interface bond separation that causes an unacceptable deviation in thrust or over pressurization leading to case failure. Conventionally, current service life predictions for rocket motors treat large populations of rocket motors as equivalent for the risk of failure and retire the group when that risk exceeds a predetermined threshold. This process tends to be conservative and the desired reliability threshold set by the customer is typically very high. The result is numerous rocket motors are removed from service, even though they may have many years of service life left.

U.S. Pat. No. 6,301,970 to Biggs et al. entitled "CUMULATIVE DAMAGE MODEL FOR STRUCTURAL ANALYSIS OF FILED POLYMERIC MATERIALS," the contents of which are herein incorporated by reference, discloses a stochastic cumulative damage model, A Global Engineering Model of Damage (AGEMOD), to forecast the probability of solid propellant structural failure. This process uses a simplified generic service history to create a temperature profile for the group of motors being modeled. A linear viscoelastic material model (LVEM) is employed to relate the temperatures the motors are subjected to, with the stresses induced in the propellant from thermal contraction. AGEMOD utilizes a Linear Cumulative Damage (LCD) calculation to forecast the reliability. This approach is a stochastic process because AGEMOD uses a Monte Carlo type simulation to model variation about the temperature and mechanical properties.

Additionally, significant advances have been made with respect to small stress sensors. These small stress sensors are miniature in size, produced in high volume, and utilize low power to provide data collection. There are a number of ongoing efforts to embed stress sensors in solid rocket motors, enabling collection of data specific to each motor and reduction of errors in the damage calculation. Utilizing embedded sensors enables the load history of individual units to be collected and analyzed, as part of an individual service life determination. This approach enables the removal of just those units whose forecast reliability has dropped to unacceptable levels. The majority of the population can remain in use until those units experience an event or degradation of properties that cause their reliability to drop. This approach is a far more efficient approach to the management of the fielded inventory and provides significant cost savings.

However, the stress sensors provide data collection over many years resulting in hundreds of thousands or millions of data points. In order for this data to be useful, the volume of data must be reduced, while the significant damage events are retained.

BRIEF SUMMARY OF THE INVENTION

In various exemplary embodiments, the present invention provides methods and systems for data smoothing raw data such as stress and temperature data. The present invention can utilize various techniques to smooth data such as dropping data using a stress threshold, dropping data by resample (or decimation), and smoothing by dynamic binning. Additionally, the present invention can utilize a transform function to estimate stress from a stress sensor to areas of peak stress. In an exemplary application, the present invention can be utilized to reduce stress and temperature data collected by a plurality of embedded stress sensors in a rocket motor for purposes of computing service life of the motor.

In an exemplary aspect of the present invention, a data smoothing method for reducing raw stress data includes receiving a data set of raw stress data; transforming the data set responsive to a transform function that accounts for the difference between the location of the gage and of the point of interest; and smoothing the raw stress data to reduce the quantity of the data set while retaining significant stress events. The data smoothing method can further include calculating a service life prediction from the reduced data set. The data smoothing method also can further include measuring the raw stress data with a plurality of embedded sensors in a rocket motor. The transform function is configured to estimate peak stress from the raw stress data set at a peak stress point in the rocket motor. The data smoothing method can further include determining a transform coefficient responsive to the geometry of the rocket motor. Optionally, the smoothing includes applying dynamic binning to the raw stress data. The dynamic binning is controlled by a dynamic stress bin trigger including a change in stress that prompts a new bin and a minimum and maximum allowable bin size, and the dynamic binning includes fewer bins in a low stress region relative to a high stress region. Alternatively, the smoothing further includes resampling the raw stress data responsive to a predetermined frequency. The smoothing can also further include dropping the raw stress data responsive to a stress threshold.

In another exemplary aspect of the present invention, a method of computing a service life prediction of a device based on measured stress includes receiving a plurality of stress measurements from one or more embedded stress sensors; smoothing the raw stress data to reduce the quantity of the data set while retaining significant stress events; calculating a service life prediction from the reduced data set; and removing the device from service responsive to the service life prediction. The method can further include applying a transform function to the raw stress data to estimate peak stress from the raw stress data set at a peak stress point in the device. The smoothing can include applying dynamic binning to the raw stress data, where the dynamic binning is controlled by a dynamic stress bin trigger including a change in stress that prompts a new bin and a minimum and maximum allowable bin size, and where the dynamic binning includes fewer bins in a low stress region relative to a high stress region. Optionally, the smoothing further includes resampling the raw stress data responsive to a predetermined frequency; and dropping the raw stress data responsive to a stress threshold.

In yet another exemplary aspect of the present invention, a data smoothing system includes means for data input and output; one or more processors coupled to memory and the means for data input and output, where one or more processors are configured to: receive a data set including raw stress data; transform the data set responsive to a transform function; smooth the raw stress data to reduce the quantity of the data set while retaining significant stress events; and calculate a service life prediction from the reduced data set The data smoothing system can further include a plurality of embedded sensors in a rocket motor, the plurality of embedded sensors are configured to measure the raw stress data. The transform function is configured to estimate peak stress from the raw stress data set at a peak stress point in the rocket motor. To smooth includes applying dynamic binning to the raw stress data, where the dynamic binning is controlled by a dynamic stress bin trigger including a change in stress that prompts a new bin and a minimum and maximum allowable bin size, where the dynamic binning includes fewer bins in a low stress region relative to a high stress region; resampling the raw stress data responsive to a predetermined frequency in the low stress region; and dropping the raw stress data responsive to a stress threshold in the low stress region.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
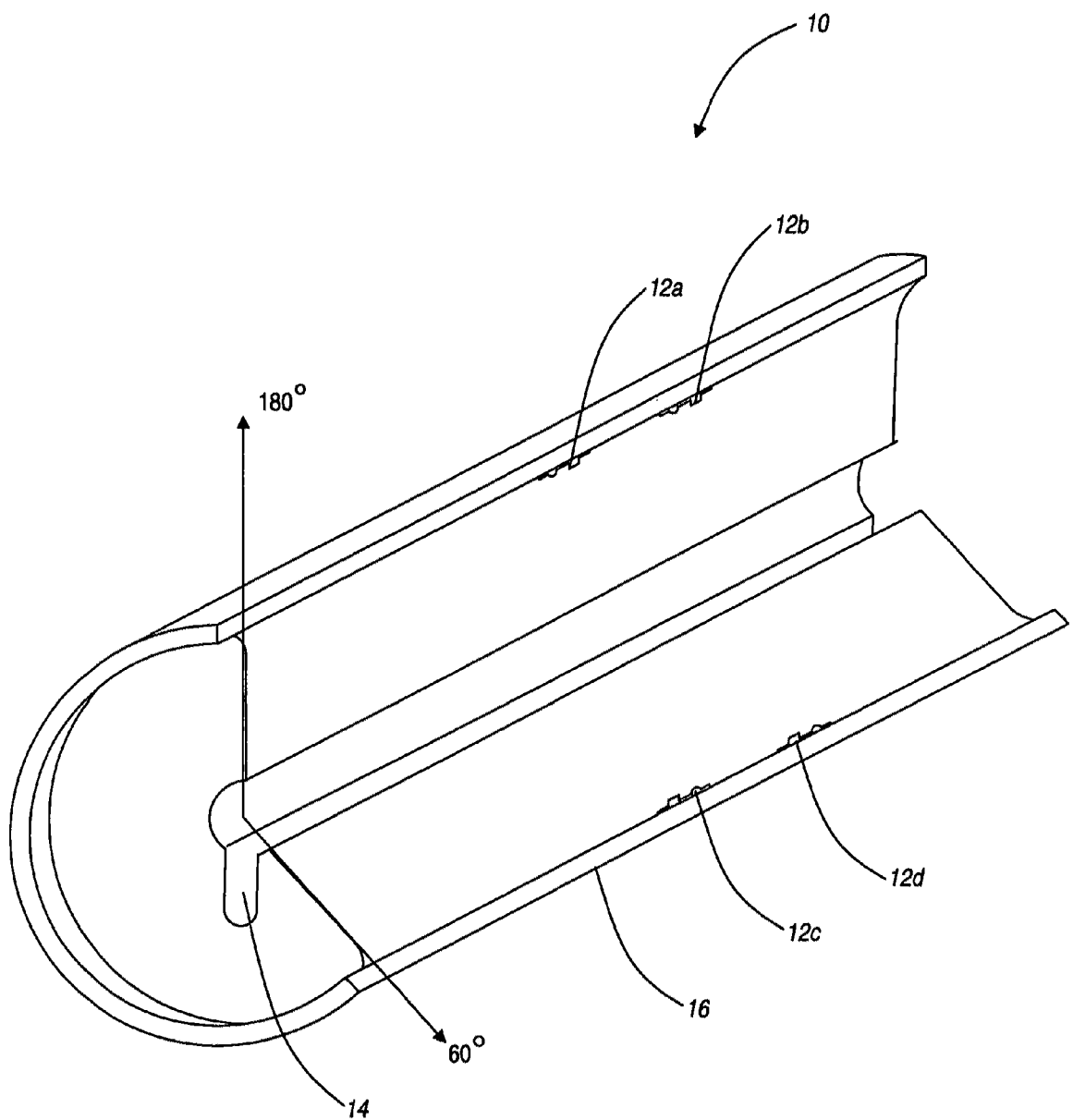
FIG. 1 illustrates a solid propellant rocket motor with multiple embedded stress sensors according to an exemplary embodiment of the present invention.

In various exemplary embodiments, the present invention provides methods and systems for data smoothing raw data such as stress data. The present invention can utilize various techniques to smooth data such as dropping data using a stress threshold, dropping data by resample (or decimation), and smoothing by dynamic binning. Additionally, the present invention can utilize a transform function to estimate stress from a stress sensor to areas of peak stress. In an exemplary application, the present invention can be utilized to reduce stress and temperature data collected by a plurality of embedded stress sensors in a rocket motor for purposes of computing service life of the motor.

The LCD approach utilized in AGEMOD is also the mechanism that can be used by hand to quantify the damage. In order to use this mechanism to estimate damage, a number of physical parameters must be determined. A series of constant strain rate tensile tests to failure have to be performed, with the propellant of interest covering a range of temperatures and strain rates. The data from these tests is manipulated to yield the time to failure, $t_f$, and applied stress, $\sigma$, as described by the relationship in equation 1.

$$\log \sigma = -\frac{1}{B}\log\left(\frac{t_f}{a_T}\right) + \log \sigma_0 \tag{1}$$

The physical parameters that are determined include the temperature shift factor, $a_T$, damage exponent, B, and the applied stress that causes fracture in unit time, $a_o$. A temperature shift factor is determined for each temperature at which constant strain rate tensile tests were performed. Equation (1) can be rearranged to yield equation (2) which enables us to calculate the expected time to failure, $t_f$, when the propellant is subjected to a known stress.

$$t_f = a_T\left(\frac{\sigma_0}{\sigma}\right)^B \tag{2}$$

The time to failure is computed for each stress in the history being examined. The ratio of the time spent at each load, t, to the time to failure at that stress level is the damage fraction, as shown by equation (3). These fractions are additive, their sum being a mean estimate of the total damage as a result of the stress history examined. What is implied by equation (3) is when these fractions sum to unity, failure is imminent.

$$D = \frac{t}{t_f} \tag{3}$$

Polymeric materials may undergo an internal tearing process when subjected to a sustained load. This damage process continues until macroscopic failure occurs. The stress data can be used to determine fatigue damage to the structure. Damage, D, is calculated by performing a numerical integration of the formula equation:

$$D = ([\sigma_0 - \sigma_\infty]^B \cdot t_0)^{-1} \int ([\sigma(t) - \sigma_\infty]^B / a_T(t)) dt \tag{4}$$

Here, the parameter $\sigma_0$ is the stress that will cause failure in unit time, $t_0$, $\sigma_\infty$ is the threshold stress below which failure will not occur irrespective of load time, and $a_T(t)$ is the time-varying (because, in general, temperature is changing with time) propellant temperature shift factor. These parameters, along with the exponent B, are measured by performing laboratory tests on tensile coupon samples. Shift factors are derived from relaxation modulus and tensile data. The remaining parameters are derived from uniaxial constant rate tensile tests (performed at a number of temperatures and strain rates) and creep testing. $\sigma(t)$ is the input stress history of interest and may be any complex sequences of stresses. The overall load sequence used may be the outcome of the structure's service environment, rather than a specific sequence of stresses. Note that in the cumulative damage model, failure is imminent when D reaches unity.

Although the LVEM model is reasonably accurate at reproducing the visco-elastic behavior of solid propellants, there is a recognized need for improvement. The attempts of engineers and scientists to develop a non-linear model have, to date, proven inadequate. There are efforts to bypass these models and eliminate the errors they introduce by directly measuring the stress levels in the propellant. The LCD approach relies on a stress based failure criterion, and therefore can use stress data produced by embedded stress sensors.

In various exemplary embodiments, the present invention provides mechanisms to capture damage controlling parts of raw data histories (i.e., the stress data). The relation between damage and stress in propellants suggests that the peak stress levels cause most of the damage, i.e., $$D \approx \sigma^B \qquad (5)$$

Referring to FIG. 1, a solid propellant rocket motor 10 is illustrated with multiple embedded stress sensors 12a-d according to an exemplary embodiment of the present invention. The data smoothing techniques of the present invention are described herein with respect to data collected from the stress sensors 12a-d. Those of ordinary skill in the art will recognize the data smoothing techniques could also be applied to any large set of data points which must be reduced while retaining significant events.

In an exemplary operation, a solid propellant rocket motor similar to 10 was stored in a magazine for an extended time period in a rather benign environment. The data collected represents conditions very similar to what is seen by a vast number of deployed rocket motors, making this data set a very good example of the "typical" data from a fielded motor.

The solid propellant rocket motor 10 includes an analog motor design having a grain keyhole slot 14. In an exemplary embodiment, two different solid propellant rocket motors 10 were used with the grain keyhole slot 14 of different depths, one shallow and one deep, (a single slot in an otherwise circular port grain design) to gather data from the sensors 12. FIG. 1 illustrates the bore geometry with the relative locations of the four embedded sensors 12a-d that were in each motor 10. The first sensor 12a is positioned at 180° and at a length position L/2, where L is the length of the motor 10. The second sensor 12b is positioned at 180° and at a length position L/2 minus 3 inches. The third sensor 12c is positioned at 60° and at a length position L/2, and the fourth sensor 12d is positioned at 60° and at a length position L/2 minus 3 inches. The solid propellant rocket motors 10 were temperature cycled hot to cold, such that the solid propellant rocket motors 10 with shallow slots 14 would crack. These conditions are far worse than deployed motors are expected to encounter.

In various exemplary embodiments, the present invention provides data smoothing using stress sensor data from the sensors 12. The sensors 12 can collect data periodically (e.g., hourly, etc.)-over an extended period of time (e.g., years), thus each sensor 12 can produce on the order of hundreds of thousands to millions of data points. Disadvantageously, these data points can be computationally intensive to process and algorithms such as the AGEMOD can handle only hundreds of data points. It is difficult to modify these algorithms to handle this large quantity of data points.

The sensors 12 can be mounted directly on a case wall 16. This location on the case wall 16 offers a stable anchor and in this location the sensors 12 are less likely to increase the peak stresses in the motor 10. The stress at the case wall can be significantly different than the peak stresses in the motor 10. Accordingly, because the damage analysis is interested in using the peak stresses, the peak stresses must be ascertained from the sensor data. In addition to performing data smoothing of the sensor data, the present invention utilizes a transform algorithm to estimate the peak stresses from the sensor data.

As noted earlier, AGEMOD currently accepts a temperature history and uses a LVEM model to calculate stresses and then uses the stress to calculate damage. Advantageously, the present invention bypasses the LVEM model using the collected stress data directly in the damage calculation providing a more accurate assessment of damage based on real data for individual motors 10. Additionally, the data smoothing of the present invention provides a more efficient calculation.

Figure 2:
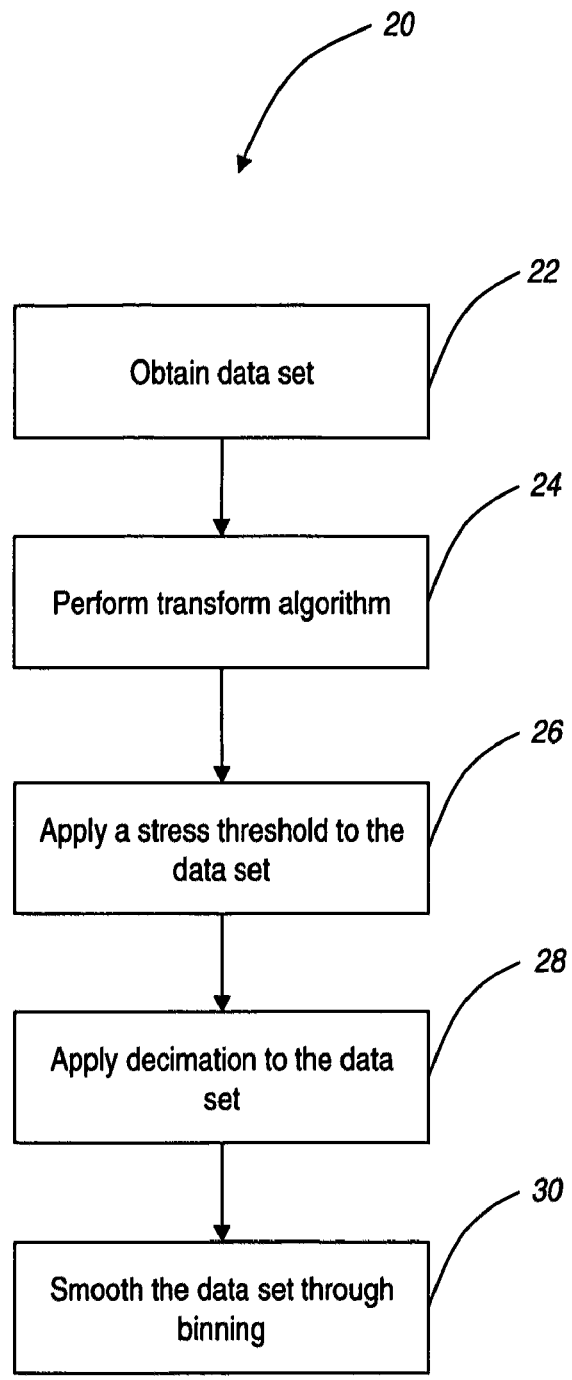
FIG. 2 illustrates a flowchart of data smoothing of stress data according to an exemplary embodiment of the present invention.

Referring to FIG. 2, a flowchart illustrates data smoothing of stress data 20 according to an exemplary embodiment of the present invention. The present invention can utilize three mechanisms of data smoothing. The sensor data is also processed through a transfer function to relate the sensor data to the peak stresses in the propellant. Accordingly, the present invention provides the three mechanisms of data smoothing and the transform function on raw stress sensor data. Additionally, the AGEMOD software has been modified to accept the smoothed stress data directly.

First, the data smoothing of stress data 20 first obtains a data set (step 22). For example, the data set can be from one or more stress sensors 12 or the like. Additionally, the present invention contemplates other mechanisms for obtaining stress data. Once the data set is obtained, a transform algorithm is performed on the data set (step 24). The transform algorithm relates measured stress values to peak stress values which may be incurred at locations different from the measurements. Next, the transformed data set is smoothed. The data smoothing of stress data 20 includes three mechanisms to reduce the size (i.e., "smooth" the data set). The three mechanisms include dropping data using a stress threshold (step 26), dropping data by resample (or decimation) (step 28), and smoothing by dynamic binning (step 30). The data smoothing of stress data 20 can use one or more of these mechanisms. Further, these mechanisms can be applied in any order.

Figure 3:
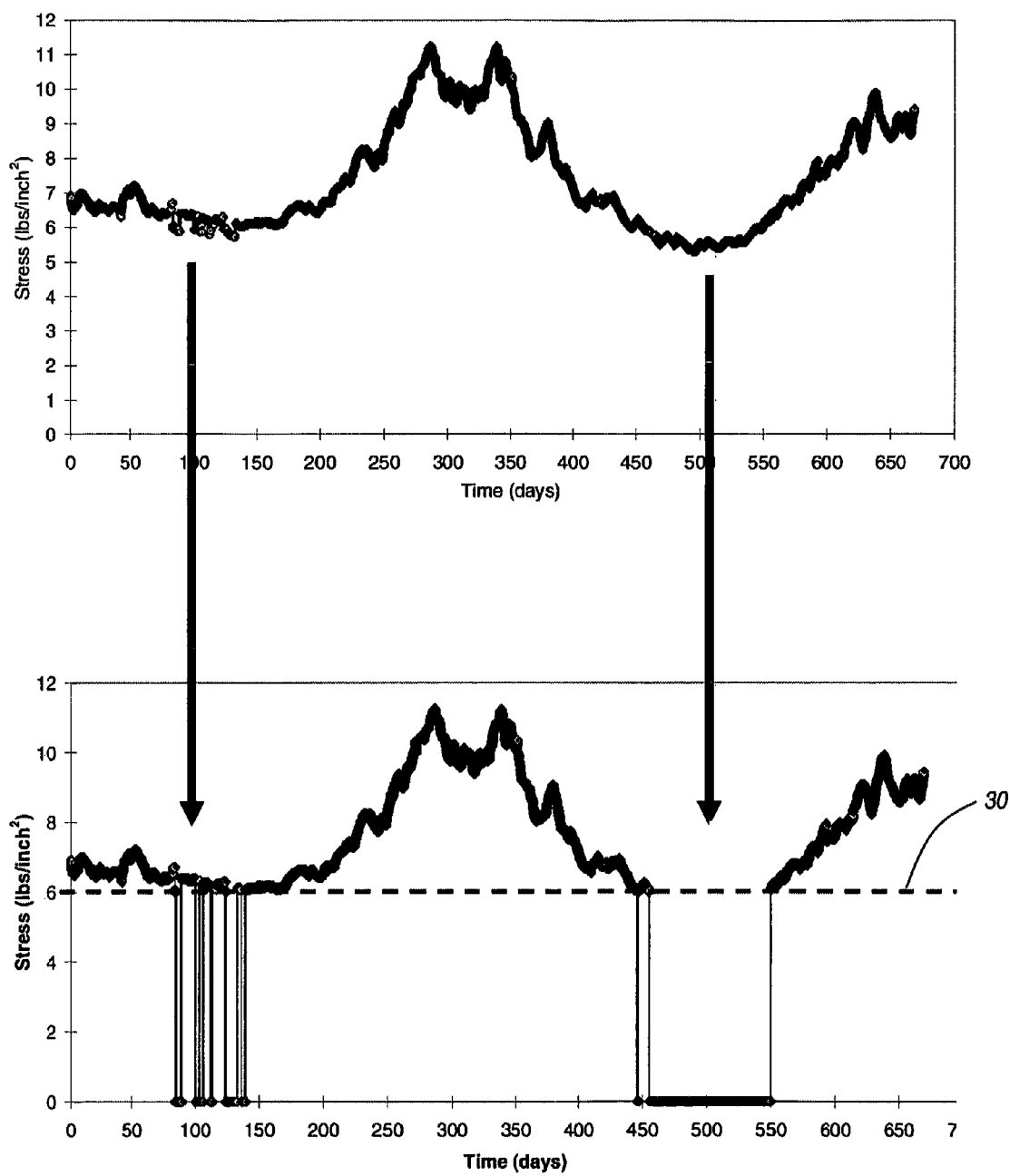
FIG. 3 illustrates graphs of raw stress data and dropping the raw stress data based on a stress threshold according to an exemplary embodiment of the present invention.

Referring to FIG. 3, graphs illustrate raw stress data and dropping the raw stress data based on a stress threshold 30 according to an exemplary embodiment of the present invention. Here, the stress threshold 30 is applied to the raw stress data, and all data points below the stress threshold 30 are dropped. This concept leverages the phenomena that for composite propellants there is some minimal applied stress, $\sigma_\infty$, at which little or no damage occurs, so stresses at or below this level can be considered negligible. This minimum stress threshold 30 is used to drop all data points with stress values below the threshold, from the data set. Additionally, the stress threshold 30 can be user configurable. Through experimentation, it was determined that to be effective in reducing the volume of stress data, the stress threshold 30 had to be considerable, but then the error introduced grew unacceptably large. However, the stress threshold 30 can be utilized with the other mechanisms to reduce the volume of stress data.

Figure 4:
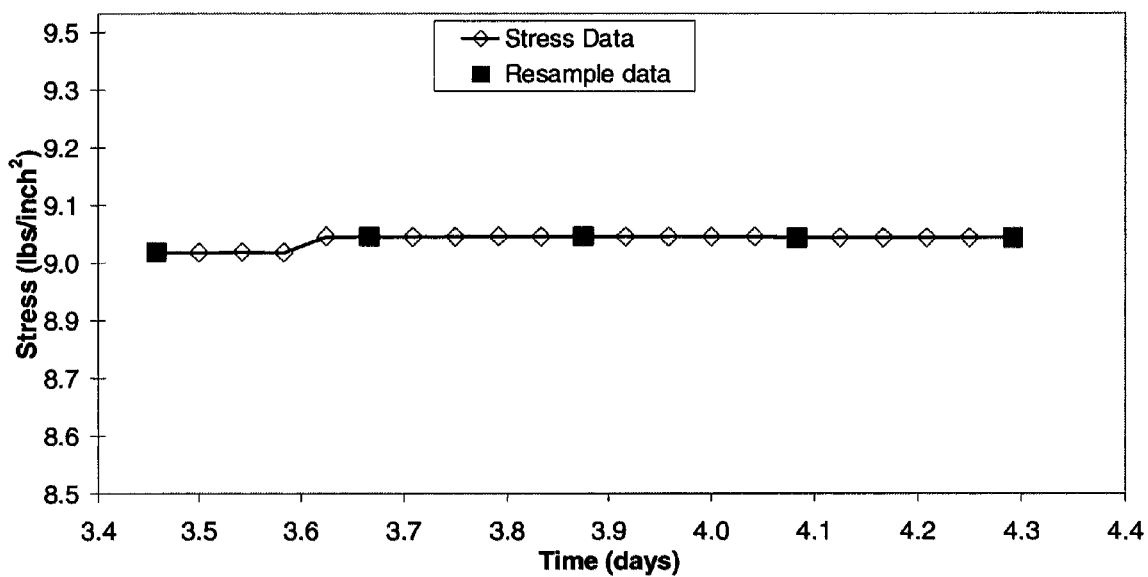
FIG. 4 illustrates a graph of resampling (or decimating) raw stress data according to an exemplary embodiment of the present invention.

Referring to FIG. 4, a graph illustrates resampling (or decimating) raw stress data according to an exemplary embodiment of the present invention. Here, a set frequency is utilized to delete data, i.e., dropping data by resample (or decimation) deletes data with the set frequency, (e.g., return every fourth observation) without regard to value. This result is the resample frequency which is adjustable (e.g., none deleted to one out of every two data points deleted).

Decimation or resample is another simple yet powerful technique to reduce the volume of data. Used alone, over the entire data set, this brute force mechanism can delete the few points that make up short time, high stress events. Used in that way also introduces unacceptably large errors. It does however make sense to use this technique selectively in the low stress regions. For example, decimation can be applied with a maximum stress threshold, where the raw stress data is decimated in just the low stress regions of choice preserving all of the original data in the high stress peaks. Specifically, decimation can be applied to user-defined valleys in the raw stress data.

Figure 5:
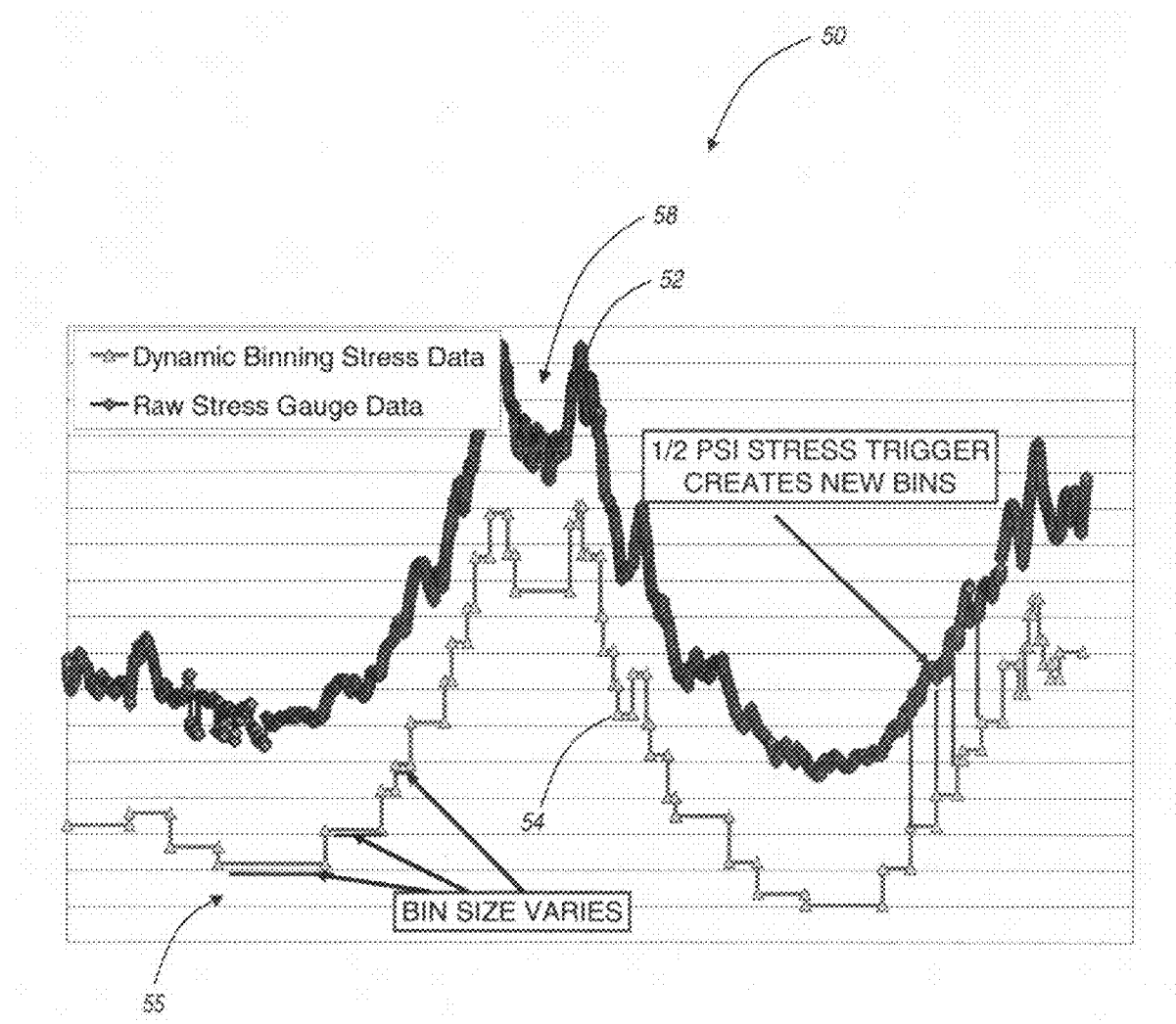
FIG. 5 illustrates a graph of single-stage dynamic binning of raw stress data according to an exemplary embodiment of the present invention.

Referring to FIG. 5, a graph 50 illustrates single-stage dynamic binning of raw stress data according to an exemplary embodiment of the present invention. The smoothing process by dynamic binning can be controlled by three parameters. The first parameter includes a dynamic stress bin trigger, the value is the magnitude of change in stress that prompts a new bin. The other two parameters are the minimum and maximum allowable bin size. These two parameters allow a user greater control in obtaining the overall desired reduction in data volume while retaining the peak stress events.

Here, to test the robustness of the data reduction scheme, the dynamic binning was applied to exemplary raw stress gauge data 52 and the result is dynamic binning stress data 54. The raw stress gauge data 52 was collected based on four sensors embedded in a motor analogue and the raw stress gauge data 52 represents averaged data collected by all four sensors averaged. Each sensor collected temperature and stress profiles that lasted a set number of days. The first set of days of the profile includes post-manufacture curing, storage, and transport. Next, the motors went into a well controlled oven where the motors were cold cycled, seventeen times, followed by cold dwell. The dynamic binning stress data 54 shows a new bin for a predetermined change in stress. In a region 56 of low stress there are relatively few bins compared to a region 58 of high stress. The raw stress gauge data 52 includes over 15,000 data points while the dynamic binning stress data 54 includes less than fifty data points.

The present invention can utilize stress smoothing by binning with a constant interval and binning with a dynamic interval. In static binning (i.e., constant interval), the data assigned to the x-axis is divided into segments of equal size or bins. Then the y-axis data within each bin is averaged. For example, data could be reduced using this static binning process with a bin size over a number of days and the stress values within each bin averaged. This approach may reduce the original number of data points to just a few points, i.e. the damage is calculated solely from the average stress over the duration of the bin interval. For example, comparing the reduced data to original data in an exemplary operation shows that it does retain some of the contour expected to be important. For example, in the exemplary operation, it was determined that static binning introduced an error of 2.3%.

In an effort to improve the fidelity of the reduction process, dynamic binning may be used. In dynamic binning, the bin size is large in regions of low stress and small in the regions of high stress. The large bins produce a greater reduction of the data, while the small bins preserve the fidelity of the peak stresses. The bin definitions can be guided by the dynamics in the stress. A new bin can be defined each time the stress increased or decreased a predetermined amount of pounds per square inch, approximately. Advantageously, this mechanism can result in the same number of data points as the static binning but it retains more of the fidelity in the peak stress regions. It is also clear that the bins are larger in the low stress regions and smaller in the high stress peaks. For example, in the exemplary operation, it was determined that dynamic binning introduced an error of just 1.4%. Further, another exemplary operation with multiple sensors determined that dynamic binning introduced an error below 1%.

Figure 6:
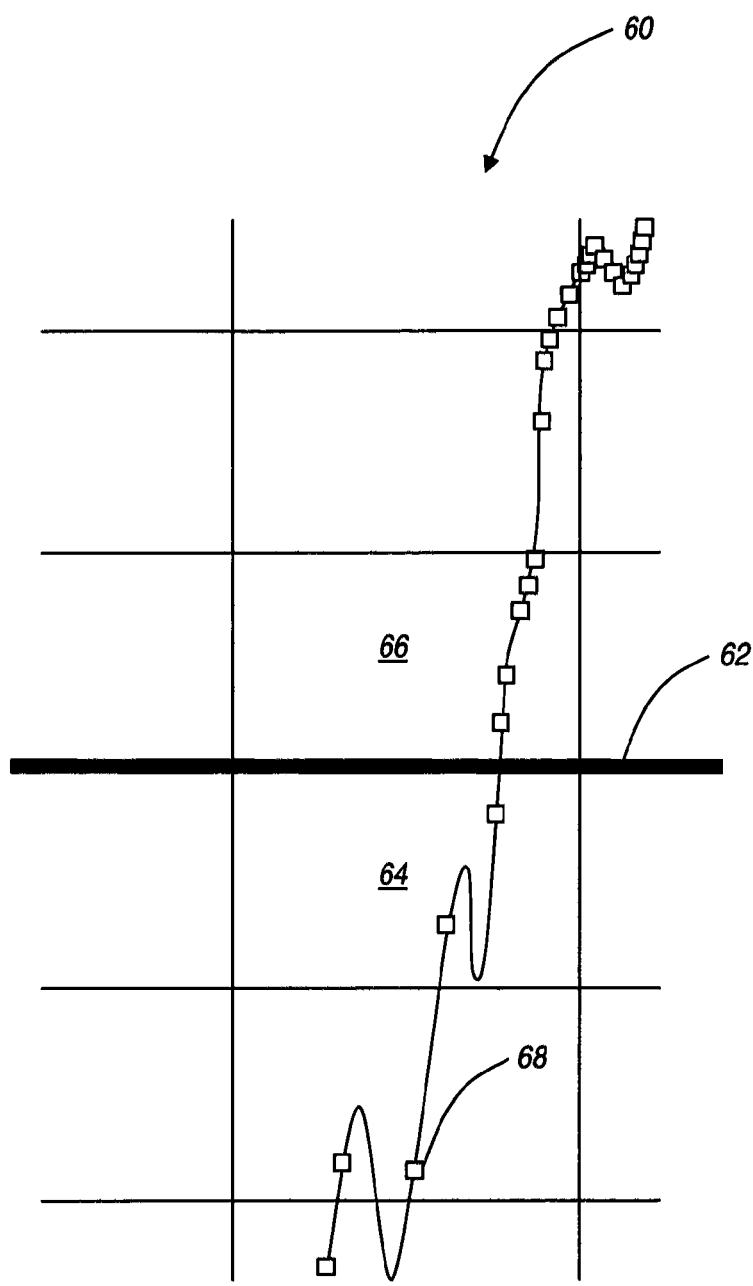
FIG. 6 illustrates a graph with two-stage dynamic binning applied to sensor data according to an exemplary embodiment of the present invention.

FIG. 6 illustrates a graph 60 of two-stage dynamic binning. A predetermined stress value threshold 62 is set to delineate a low stress region 64 from a high stress region 66. The graph includes a plurality of bins 68 with fewer bins 68 in the low stress region 64 than in the high stress region 66. A set of minimum and maximum bin sizes are defined for the low stress region and a second set for the high stress region.

Figure 7:
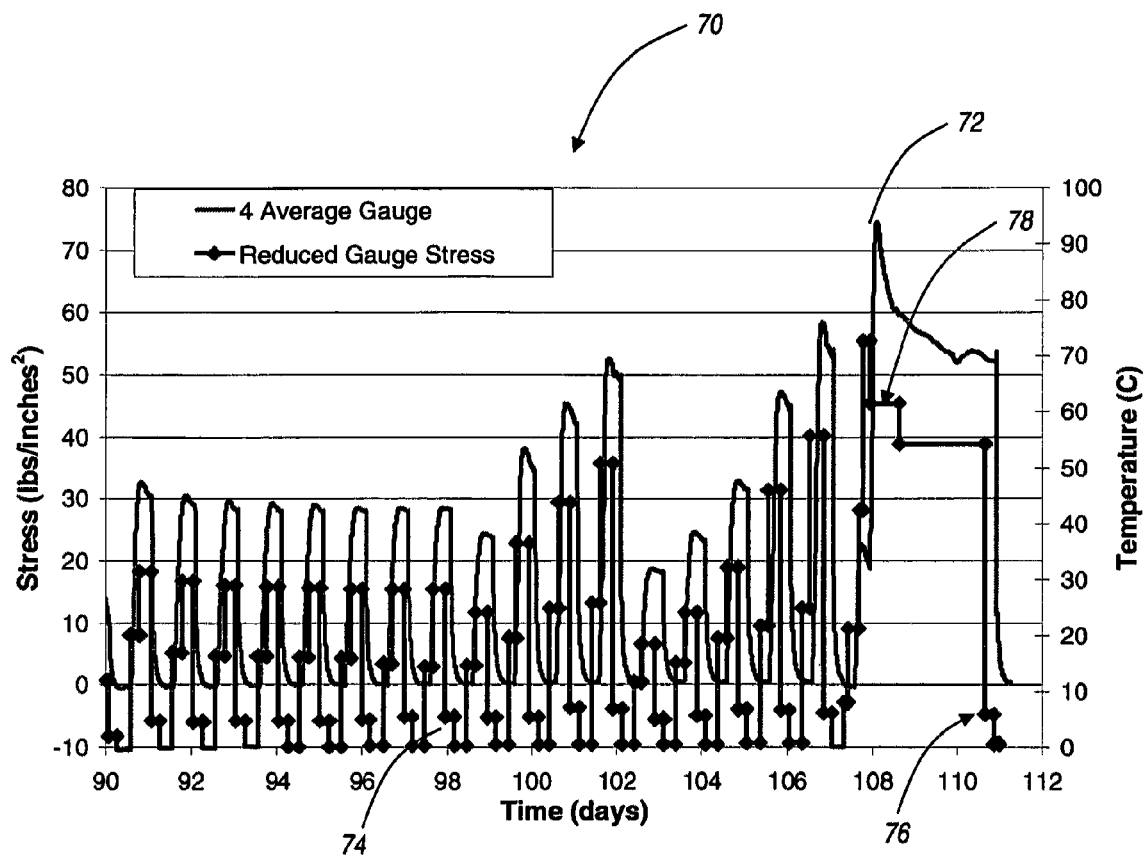
FIG. 7 illustrates dynamic binning applied to sensor data from thermal cycling a motor of FIG. 1 according to an exemplary embodiment of the present invention.

Referring to FIG. 7, a graph 70 illustrates dynamic binning applied to sensor data from thermal cycling the motor 10 of FIG. 1 according to an exemplary embodiment of the present invention. Here, to test the robustness of the data reduction scheme, the dynamic binning was applied to the exemplary raw stress gauge data 72 and the result is dynamic binning stress data 74. The raw stress gauge data 72 was collected based on four sensors embedded in a motor analogue and the raw stress gauge data 72 represents averaged data collected by all four sensors averaged. Each sensor collected temperature and stress profiles that lasted a set number of days. The first set of days of the profile includes post-manufacture curing, storage, and transport. Next, the motors went into a well controlled oven where the motors were cold cycled, seventeen times, followed by cold dwell.

The dynamic binning stress data 74 shows a new bin for a predetermined change in stress. In a region 76 of low stress there are relatively few bins compared to a region 78 of high stress. The raw stress gauge data 72 includes over 15,000 data points while the dynamic binning stress data 74 includes less than 50 data points. The difference in calculated damage between these two data sets is less than 1.5%.

Figure 8:
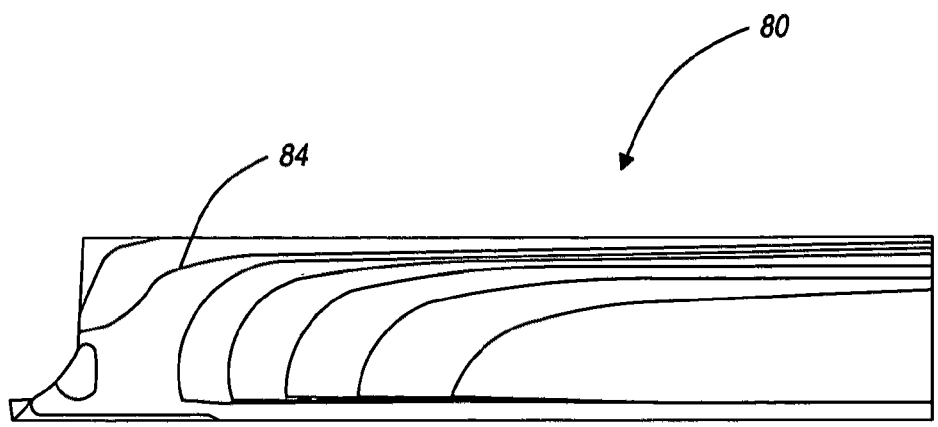
FIG. 8 illustrates a contour plot showing different stress levels on the motor of FIG. 1 for end stress effects and the circumferential stress effects.
Figure 8:
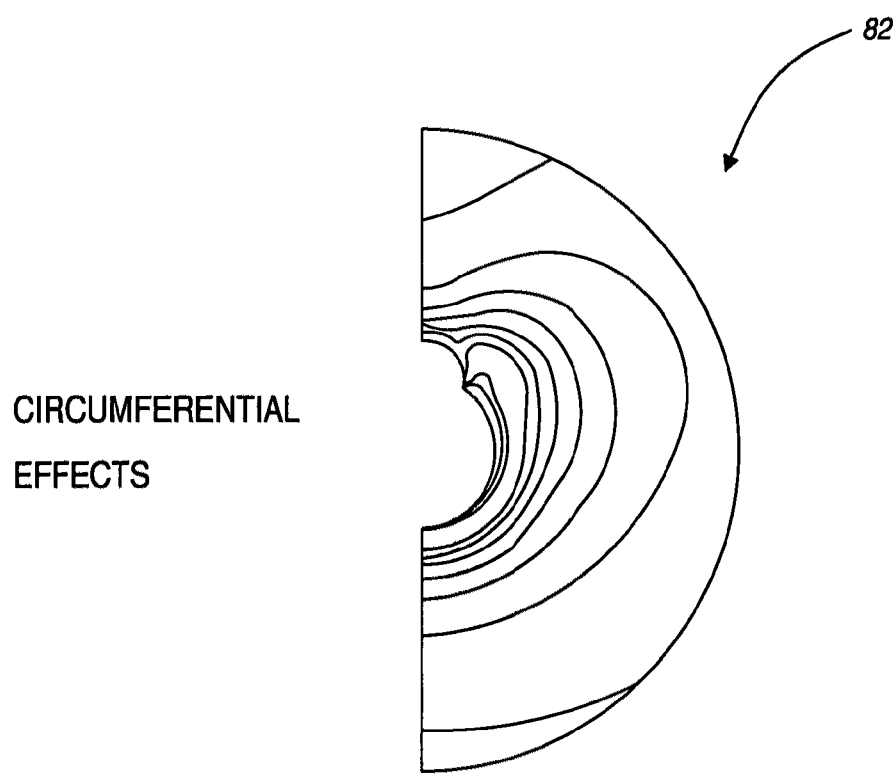

Referring to FIG. 8, as illustrated in step 24 of FIG. 2, the embedded stress sensors require a transfer algorithm to estimate the stresses in the grain regions where they are highest, from the sensor data. There has been recent work by Little et al. (Final Report: KTA 4-29 MECHANICAL AGING OF SOLID ROCKET MOTORS; April 2006) to develop an algorithm that indicates the relation may be just a simple coefficient, determined from the ratio of the sensor stress to the peak stress, in the region desired. In the exemplary motors (e.g., FIG. 1), the grain keyhole slot 14 tips are the location of the peak stresses, by design, while the sensors 12 are bonded to the case wall 16. Since the peak stresses in the motor are not directly measured, they can be estimated then using the LVEM model. Although this simple approach does not include the effect of prior loading on the current state of mechanical properties, it is computationally tractable and has proven reasonably accurate when used to model such motor tests.

Using the high stresses of each temperature cycle a set of transfer coefficients, i.e. the ratio of the model slot tip to case wall gage measured stress and an additive constant, can be calculated. The higher the coefficient, the greater the damage calculated. Transform coefficients depend on grain geometry; hence the values must be tailored to different motor designs. FIG. 8 illustrates end effects 80 and circumferential effects 82 of stress on a motor. FIG. 8 is a contour plot showing different stress levels 84 on the motor for the end effects 80 and the circumferential effects 82. From the geometry, a sensor to peak transform function can be developed, i.e. peak $\sigma_{LVEM}/\sigma_{gauge}$. For example, the Inventors have determined that for a typical motor such as the one illustrated in FIG. 1, a multiplicative factor is approximately 3. A constant i.e. shift constant, may be added after the gage stress is multiplied by this factor to account for end effects, if the sensor is not mounted at some longitudinal location where the peak stress occurs.

Figure 9:
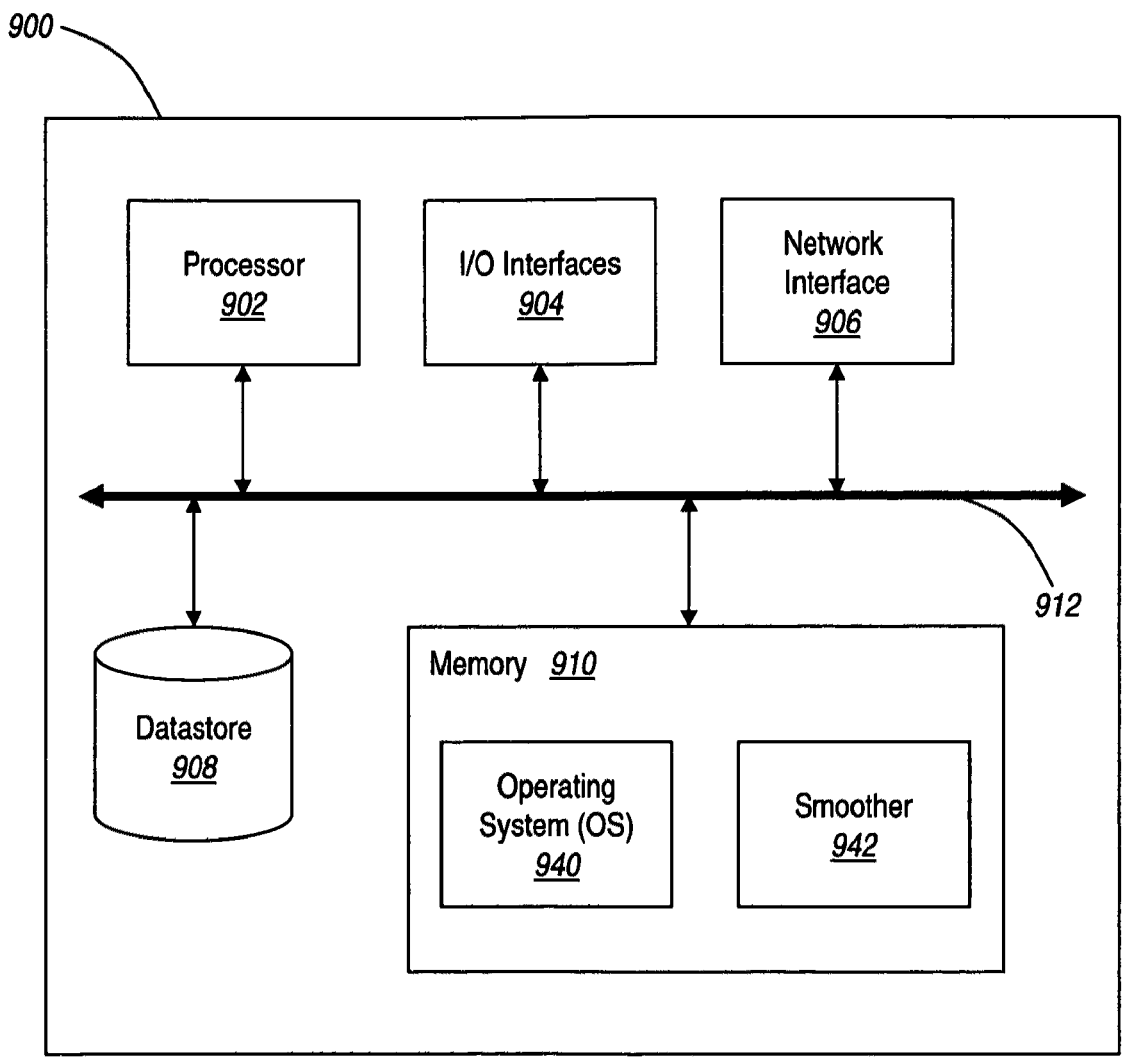
FIG. 9 illustrates a block diagram of a server for executing data smoothing according to an exemplary embodiment of the present invention.

Referring to FIG. 9, a block diagram illustrates a server 900 for executing data smoothing according to an exemplary embodiment of the present invention. The server 900 can be a digital computer that, in terms of hardware architecture, generally includes a processor 902, input/output (I/O) interfaces 904, network interfaces 906, memory 910, and a data store 908. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the server 900, a semiconductor-based microprocessor (in the form of a microchip or chip set), or generally any device for executing software instructions. When the server 900 is in operation, the processor 902 is configured to execute software stored within the memory 910, to communicate data to and from the memory 910, and to generally control operations of the server 900 pursuant to the software instructions.

The I/O interfaces 904 can be used to receive user input from and/or for providing system output to one or more devices or components. User input can be provided via, for example, a keyboard and/or a mouse. System output can be provided via a display device and a printer (not shown). I/O interfaces 904 can include, for example, a serial port, a parallel port, a small computer system interface (SCSI), an infrared (IR) interface, a radio frequency (RF) interface, and/or a universal serial bus (USB) interface.

The network interfaces 906 can be used to enable the server 900 to communicate on a network, such as to a client or the like. The network interfaces 906 can include, for example, an Ethernet card (e.g., 10BaseT, Fast Ethernet, Gigabit Ethernet) or a wireless local area network (WLAN) card (e.g., 902.11a/b/g/n). The network interfaces 906 can include address, control, and/or data connections to enable appropriate communications on the network.

A data store 908 can be used to store data, such as raw sensor data, smoothed sensor data, and the like. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. In one example, the data store 908 can be located internal to the server 900 such as, for example, an internal hard drive connected to the local interface 912 in the server 900.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 may incorporate electronic, magnetic, optical, and/or other types of storage media. Note that the memory 910 can have a distributed architecture, where various components are situated remotely from one another, but can be accessed by the processor 902.

The software in memory 910 can include one or more software programs, each of which includes an ordered listing of executable instructions for implementing logical functions. In the example of FIG. 9, the software in the memory system 910 includes a suitable operating system (O/S) 940 and a smoother program 942. The operating system 940 essentially controls the execution of other computer programs, such as the smoother program 942, and provides scheduling, input-output control, file and data management, memory management, and communication control and related services. The operating system 940 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

The smoother program 942 includes computer executable code configured to perform a transform function and data smoothing on raw data according to an exemplary embodiment of the present invention. For example, the smoother program 942 can be configured to execute the data smoothing of stress data 20 in FIG. 2. The smoother program 942 can first perform the transform function. This operation can be controlled by two parameters, a shift constant added to stress values and a multiplicative factor as described above in FIG. 7.

As described herein, the stress threshold mechanism is inadequate by itself, but is available in the smoother program 942 as a brute force first-pass operation. This mechanism is controlled by the user with a single stress threshold value input. The decimation process is an available option controlled by a single stress threshold value and a frequency input. The threshold defines the maximum stress value decimation will be performed on. Decimation is therefore performed on all values below the threshold, but leaves the data above the threshold pristine. Again, the intention is to preserve the fidelity in the high stress events while accomplishing much of the reduction of data points in the low stress regions. Alai to this end, the dynamic binning is applied in two stages, the first stage is the low stress region and the second is a high stress region. The boundary between the stages is defined by a stress threshold below which is the first stage and above is the second stage. Each stage has a set of controlling parameters including a dynamic stress bin trigger value to create bins and a minimum and maximum limit on the bin sizes. The two stages and their separate controlling parameters allow a much greater density of bins above the threshold compared to below.

To operate the smoother program 942, a user can click a smoother icon and the program starts. A raw stress temperature data file can be loaded and this is accomplished by clicking a button named "load file" on the input page, browsing and selecting the desired file. All of the parameters can be set on the input page or the default values can be used without change. To execute the program, the button "run" must be clicked. To examine the results, the output tab must be clicked selecting the output page. This page displays the raw stress profile, the profile resulting from dynamic binning and the profile resulting from decimation and binning (if decimation is used). The resulting profiles can individually be downloaded to a file. The user can select either the export decimated or the export binned button to send that data set to a file. The user is prompted to provide a name for the file to be saved under.

The smoother program 942 can include interactive features that allow the user to change all of the controlling parameters; the stress threshold, the resample frequency, the resample threshold, the first and second stage dynamic stress bin trigger, minimum and maximum bin size and the stage threshold The feature that enables adjusting of these parameters consists of a combination numeric input and up and down arrows. The smoother program 942 can retain the last value of each parameter used as the default for the next time the smoother program 942 is used.

An output of the smoother program 942 includes a reduced data set. Additionally, the existing AGEMOD program has been modified for the direct input of this reduced data set. These modifications include a new input file format to AGEMOD, calculating the damage directly from stress measured by the sensor, and checking the process by comparison to the results obtained from the original temperature based routine. Accordingly, this modified AGEMOD code can be run with either temperature or stress as the input.

Alternatively, the smoother program 942 can include a single package that performs all tasks automatically. For example, here the smoother program 942 can automatically read a file, smooth the data, calculate damage for the raw and smoothed data, calculate the error, adjust the smoothing parameters to minimize the error and repeat the process until the error is smaller than some acceptable threshold. For example, the smoother program 942 could be part of a "missile readiness" on-board system. Like a car dashboard, there will be a green light for when the missile is good and when this software calculates unacceptable damage a red light will indicate the missile is no good.

Advantageously, the smoother program 942 provides an enormous reduction in time/labor. As a practical matter, the automation of the data smoothing through the smoother program 942 has made feasible the individual evaluation of rocket motors fitted with stress sensors and data loggers. As currently envisioned there will be multiple stress sensors embedded in each rocket motor and each sensor would be queried multiple times per day. Each sensor would create a stress profile and that eventually may include twenty or more years of the motor's history. Each of the data files includes tens of thousands of data points that may need to be evaluated for that motor's individual service life evaluation. Prior to the smoother program 942, the capability to handle such numerous and large data files did not exist. These individual service life predictions eliminate a considerable amount of waste associated with the generic service life predictions.

Although the present invention has been illustrated and described herein with reference to exemplary embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A data smoothing method for reducing raw stress data, comprising:
   receiving a data set at a processor,
      wherein said data set comprises raw stress data from at least one sensor;
   transforming the data set responsive to a transform function using said processor; and
   smoothing the raw stress data to reduce the quantity of the data set while retaining significant stress events for yielding a reduced data set,
      wherein said smoothing comprises dynamic binning is applied to the raw stress data,
      wherein the dynamic binning is controlled by a minimum and maximum allowable bin size, and
      wherein the dynamic binning comprises fewer bins in a low stress region relative to a high stress region.

2. The data smoothing method of claim 1, further comprising calculating a service life prediction from the reduced data set.

3. The data smoothing method of claim 1, further comprising measuring the raw stress data with said at least one sensor being embedded in a rocket motor.

4. The data smoothing method of claim 3, wherein the transform function is configured to estimate peak stress from the raw stress data set at a peak stress point in the rocket motor.

5. The data smoothing method of claim 3, further comprising determining a transform coefficient responsive to a geometry of the rocket motor.

6. The data smoothing method of claim 1, wherein the dynamic binning is controlled by a dynamic stress bin trigger where a change in stress prompts a new bin, and wherein the dynamic binning is controlled by a minimum and maximum allowable bin size.

7. The data smoothing method of claim 1, wherein the smoothing further comprises the raw stress data is re-sampled responsive to a predetermined frequency.

8. The data smoothing method of claim 1 wherein the smoothing further comprises the raw stress data is dropped responsive to a stress threshold.

9. The data smoothing method of claim 1, wherein the smoothing comprises dynamic binning is applied to the raw stress data,
   wherein the dynamic binning is controlled by a dynamic stress bin trigger where a change in stress prompts a new bin,
   wherein the dynamic binning is controlled by a minimum and maximum allowable bin size,
   wherein the dynamic binning comprises fewer bins in a low stress region relative to a high stress region,
   wherein the raw stress data is re-sampled responsive to a predetermined frequency in the low stress region; and
   wherein the raw stress data is dropped responsive to a stress threshold in the low stress region.

10. A method of computing a service life prediction of a device being based on measured stress, comprising:
   receiving stress measurements from at least one embedded stress sensors yielding a data set comprising raw stress data;
   smoothing the raw stress data for reducing a quantity of the data set while retaining significant stress events using a processor for producing a reduced data set;
   calculating a service life prediction from the reduced data set; and
   removing the device from service responsive to the service life prediction,
      wherein smoothing comprises dynamic binning is applied to the raw stress data
      wherein the dynamic binning is controlled by a dynamic stress bin trigger comprising a change in stress that prompts a new bin and a minimum and maximum allowable bin size,
      wherein the dynamic binning is controlled by a minimum and maximum allowable bin size, and wherein the dynamic binning comprises fewer bins in a low stress region relative to a high stress region.

11. The method of claim 10, further comprising applying a transform function to the raw stress data for estimating peak stress from the raw stress data set at a peak stress point in the device.

12. The method of claim 10, wherein the smoothing further comprises the raw stress data is re-sampled responsive to a predetermined frequency; and the raw stress data is dropped responsive to a stress threshold.

13. The method of claim 10, wherein smoothing comprises dynamic binning is applied to the raw stress data,
- wherein the dynamic binning is controlled by a dynamic stress bin trigger where a change in stress prompts a new bin,
- wherein the dynamic binning is controlled by a minimum and maximum allowable bin size,
- wherein the dynamic binning comprises fewer bins in a low stress region relative to a high stress region,
- wherein the raw stress data is re-sampled responsive to a predetermined frequency in the low stress region; and
- wherein the raw stress data is dropped responsive to a stress threshold in the low stress region.

14. A data smoothing system, comprising:
a structure for data input and output;
at least one processor being coupled to a memory and said structure for said data input and output,
- wherein said at least one processor is configured to receive a data set, which comprises raw stress data, transform the data set responsive to a transform function, smooth the raw stress data to reduce the quantity of the data set while retaining significant stress events, and calculate a service life prediction from the reduced data set, and a plurality of embedded sensors in a rocket motor,
- wherein the plurality of embedded sensors are configured to measure the raw stress data
- wherein said smooth comprises dynamic binning is applied to the raw stress data
- wherein the dynamic binning is controlled by a dynamic stress bin trigger where a change in stress prompts a new bin,
- wherein the dynamic binning is controlled by a minimum and maximum allowable bin size,
- wherein the dynamic binning comprises fewer bins in a low stress region relative to a high stress region,
- wherein the raw stress data is re-sampled responsive to a pre-determined frequency in the low stress region; and
- wherein the raw stress data is dropped responsive to a stress threshold in the low stress region.

15. The data smoothing system of claim 14 wherein the transform function is configured to estimate peak stress from the raw stress data set at a peak stress point in the rocket motor.

* * * * *